United States Patent
Jeong et al.

(10) Patent No.: US 10,754,082 B2
(45) Date of Patent: Aug. 25, 2020

(54) BACKLIGHT UNIT AND DISPLAY DEVICE INCLUDING THE SAME

(71) Applicant: Samsung Display Co., Ltd., Yongin-Si, Gyeonggi-Do (KR)

(72) Inventors: Wee Joon Jeong, Seongnam-si (KR); Keun Ho Lee, Hwaseong-si (KR); Min Gwan Hyun, Yongin-si (KR); Tae Gil Kang, Hwaseong-si (KR); Jin Soo Shin, Suwon-si (KR)

(73) Assignee: Samsung Display Co., Ltd. (KR)

( * ) Notice: Subject to any disclaimer, the term of this patent is extended or adjusted under 35 U.S.C. 154(b) by 17 days.

(21) Appl. No.: 16/030,640

(22) Filed: Jul. 9, 2018

(65) Prior Publication Data
US 2019/0129083 A1   May 2, 2019

(30) Foreign Application Priority Data
Nov. 2, 2017 (KR) .......................... 10-2017-0145121

(51) Int. Cl.
*F21V 8/00*   (2006.01)
(52) U.S. Cl.
CPC ........... *G02B 6/005* (2013.01); *G02B 6/0055* (2013.01); *G02B 6/0065* (2013.01)
(58) Field of Classification Search
CPC ..... G02B 6/0011; G02B 6/005; G02B 6/0065
See application file for complete search history.

(56) References Cited

U.S. PATENT DOCUMENTS

| | | | |
|---|---|---|---|
| 6,490,016 B1* | 12/2002 | Koura | G02F 1/133308 349/58 |
| 7,605,880 B2 | 10/2009 | Hsiao | |
| 2002/0000979 A1* | 1/2002 | Furuhashi | G06F 3/045 345/173 |
| 2008/0297681 A1* | 12/2008 | Yang | G02F 1/133308 349/58 |
| 2011/0103041 A1* | 5/2011 | Mathew | G06F 1/1616 362/97.3 |
| 2012/0162875 A1* | 6/2012 | Shimomichi | G06F 1/1601 361/679.01 |

(Continued)

FOREIGN PATENT DOCUMENTS

KR   10-2012-0123767 A   11/2012
KR   10-2014-0058991 A   5/2014

(Continued)

OTHER PUBLICATIONS

Machine translation of KR 20140058991 (Publication No. 101958011) (Year: 2014).*

*Primary Examiner* — Leah Simone Macchiarolo
(74) *Attorney, Agent, or Firm* — Innovation Counsel LLP

(57) ABSTRACT

Backlight unit and display device are provided. According to an exemplary embodiment of the present disclosure, a backlight unit includes a glass light guide plate having an upper surface, a light-incident surface which is disposed on one side of the upper surface, and an opposite surface which is disposed on the other side of the upper surface; a light source disposed to face the light-incident surface; and a light-shielding member including a first light-shielding portion, which is in contact with the opposite surface, and a second light-shielding portion, which is in contact with part of the upper surface.

20 Claims, 13 Drawing Sheets

(56) References Cited

U.S. PATENT DOCUMENTS

| | | | | |
|---|---|---|---|---|
| 2014/0184931 A1* | 7/2014 | Rikiishi | ................... | H04N 5/64 |
| | | | | 348/843 |
| 2015/0260908 A1* | 9/2015 | Kiguchi | ............... | G02B 6/0051 |
| | | | | 349/58 |
| 2015/0277028 A1* | 10/2015 | Nishii | ............... | G02F 1/133615 |
| | | | | 362/612 |
| 2018/0149800 A1* | 5/2018 | Kim | ..................... | G02B 6/0055 |

FOREIGN PATENT DOCUMENTS

| KR | 10-2015-0066318 A | 6/2015 |
|---|---|---|
| KR | 10-2016-0034510 A | 3/2016 |

\* cited by examiner

BACKLIGHT UNIT AND DISPLAY DEVICE INCLUDING THE SAME

This application claims priority to Korean Patent Application No. 10-2017-0145121, filed on Nov. 2, 2017, and all the benefits accruing therefrom under 35 U.S.C. § 119, the disclosure of which is incorporated herein by reference in its entirety.

BACKGROUND

1. Field

The present disclosure relates to a backlight unit and a display device including the same.

2. Description of the Related Art

The importance of display devices has steadily grown with recent developments in multimedia technology. As a result, a variety of display devices such as a liquid crystal display (LCD) device, an organic light-emitting display device, and the like have been developed and widely used.

The LCD device, which is one of the most widely-used flat panel displays, includes two substrates on which field-generating electrodes such as pixel electrodes and a common electrode are formed and a liquid crystal layer which is interposed between the two substrates. The LCD device forms an electric field in the liquid crystal layer by applying voltages to the field-generating electrodes so as to determine the orientation of liquid crystal molecules in the liquid crystal layer, and displays an image by controlling the polarization of light incident thereupon using the electric field.

The LCD device requires a backlight unit, which provides light for displaying an image. The light use efficiency of the LCD device may vary depending on the structures of the LCD device and the backlight unit. Also, in a case where light undesirably leaks out of the back light unit, display defects may be caused.

SUMMARY

Exemplary embodiments of the present disclosure provide a backlight unit capable of preventing a light leakage phenomenon.

Exemplary embodiments of the present disclosure also provide a backlight unit capable of realizing a narrow bezel.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, a backlight unit includes: a glass light guide plate having an upper surface, a light-incident surface which is disposed on one side of the upper surface, and an opposite surface which is disposed on the other side of the upper surface; a light source disposed to face the light-incident surface; and a light-shielding member including a first light-shielding portion which is in contact with the opposite surface, and a second light-shielding portion which is in contact with part of the upper surface.

The light-shielding member may comprise stainless steel.

The light-shielding member may comprise an adhesive disposed between the opposite surface and the light-shielding member.

The first light-shielding portion may be bonded to the opposite surface, and the second light-shielding portion may be bonded to the upper surface adjacent to the opposite surface.

The second light-shielding portion may extend over the upper surface by as much as a first length, and the first length may be 0.4 mm to 0.6 mm.

The second light-shielding portion may have a first side, which is disposed on the upper surface, and lateral sides, which are disposed on both sides of the first side, and the lateral sides may extend in diagonal directions.

The glass light guide plate may further comprise a first lateral surface and a second lateral surface which are opposite to each other and connect the light-incident surface and the opposite surface, and the backlight unit may further comprise a first-side light-shielding member and a second-side light-shielding member which are disposed on the first lateral surface and the second lateral surface, respectively.

The backlight unit may further include an optical sheet disposed on the glass light guide plate, the optical sheet including at least one protrusion, which extends in a first direction opposite to a center of the light guide plate, wherein each of the first-side light-shielding member and the second-side light-shielding member may include at least one recess which is recessed in the first direction.

The backlight unit may further include a gap disposed between the light-shielding member and the first-side light-shielding member.

The light-shielding member, the first-side light-shielding member, and the second-side light-shielding member may be formed of a same material and are formed in one piece.

The backlight unit may further include a cover disposed on part of the upper surface adjacent to the light-incident surface.

The backlight unit may further include a reflective portion disposed between the opposite surface and the first light-shielding portion.

The reflective portion may comprise a metal, and the first light-shielding portion may comprise a black pigment.

A reflective coating may be formed on an inner side of the first light-shielding portion which faces the glass light guide plate.

The glass light guide plate may further include a lower surface, which is opposite to the upper surface, and the light-shielding member may further include a third light-shielding portion, which is in contact with the lower surface.

The first light-shielding portion may have a first thickness, the second light-shielding portion may have a second thickness, and the second thickness may be greater than the first thickness.

The first thickness may be 0.3 mm to 0.4 mm, and the second thickness may be 0.6 mm 0.7 mm.

According to another exemplary embodiment of the present disclosure, a display device includes: a backlight unit; and a display panel disposed on the backlight unit, wherein the backlight unit includes a glass light guide plate having an upper surface, a light-incident surface, which is disposed on one side of the upper surface, and an opposite surface, which is disposed on the other side of the upper surface, a light source disposed to face the light-incident surface, and a light-shielding member including a first light-shielding portion, which is in contact with the opposite surface, and a second light-shielding portion, which is in contact with part of the upper surface.

The display device may further include a cushion portion disposed on the second light-shielding portion.

The display device may further include: a bottom chassis receiving the backlight unit, and an adhesive layer disposed between the bottom chassis and the glass light guide plate and attaching the bottom chassis and the glass light guide plate together.

According to the aforementioned and other exemplary embodiments of the present disclosure, a light leakage phenomenon that may occur in a display device can be suppressed.

In addition, a narrow bezel can be realized.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Figure 1:
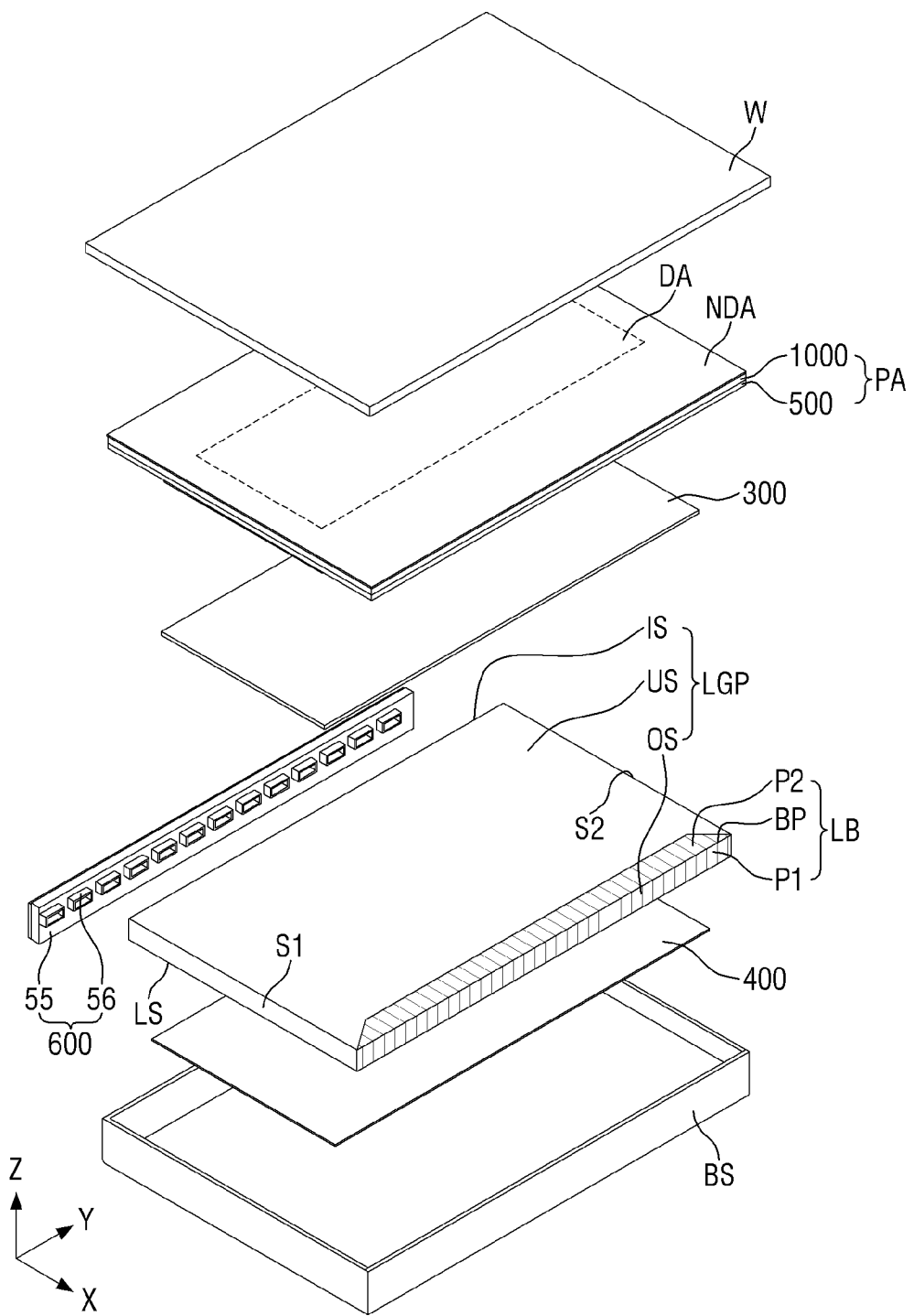
FIG. 1 is an exploded perspective view of a display device according to an exemplary embodiment of the present disclosure.

The aspects and features of the present inventive concept and methods for achieving the aspects and features will be apparent by referring to the embodiments to be described in detail with reference to the accompanying drawings. However, the present inventive concept is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the inventive concept, and the present inventive concept is only defined within the scope of the appended claims.

The term "on" that is used to designate that an element is on another element or located on a different layer or a layer includes both a case where an element is located directly on another element or a layer and a case where an element is located on another element via another layer or still another element. In the entire description of the present inventive concept, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Hereinafter, embodiments of the present inventive concept will be described with reference to the attached drawings.

FIG. 1 is an exploded perspective view of a display device according to an exemplary embodiment of the present disclosure.

Figure 2:
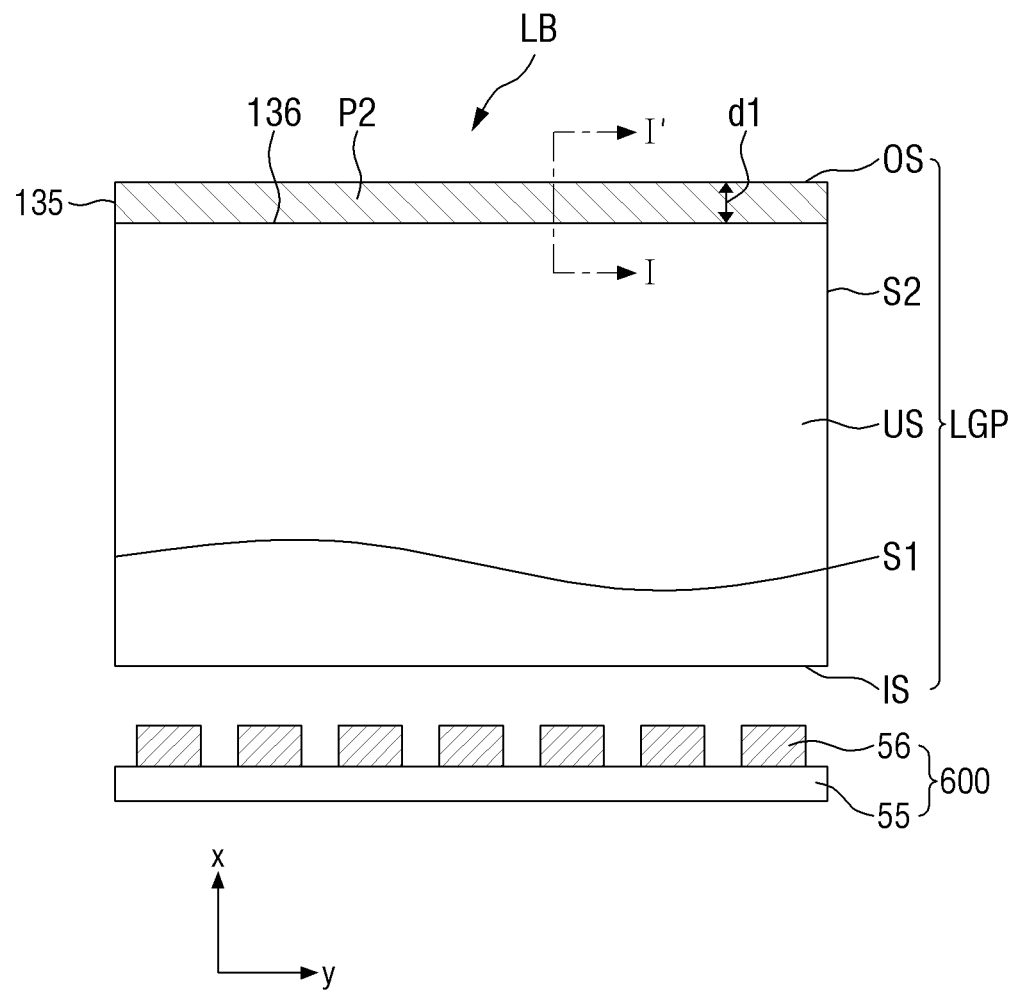
FIG. 2 is a partial plan view of FIG. 1.
Figure 3:
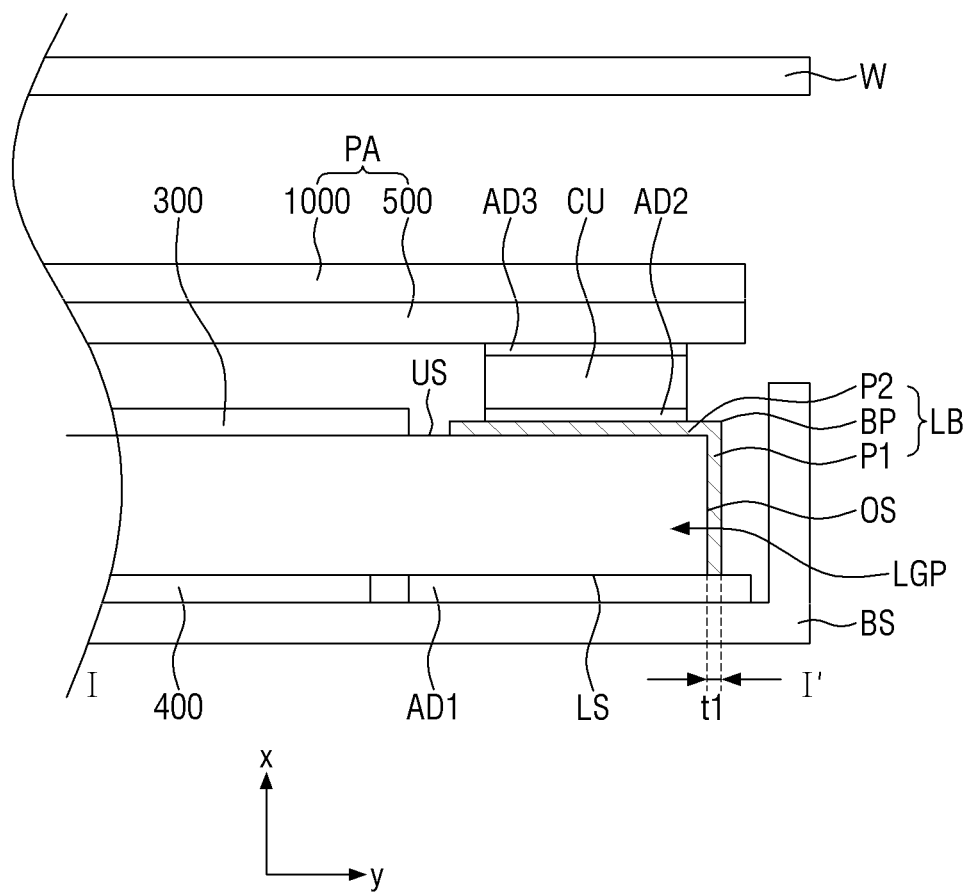
FIG. 3 is a cross-sectional view taken along line I-I' of FIG. 2.

FIG. 2 is a partial plan view of FIG. 1. FIG. 3 is a cross-sectional view taken along line I-I' of FIG. 2.

Referring to FIGS. 1 through 3, the display device according to an exemplary embodiment of the present disclosure includes a backlight unit and a display panel PA, which is disposed on the backlight unit. The backlight unit includes a glass light guide plate LGP and a light-shielding member LB.

The glass light guide plate LGP guides light provided by a light source 600 and thus provides the light to the display panel PA that will be described later.

In one exemplary embodiment, the glass light guide plate LGP may have an upper surface US and a lower surface LS, which are opposite to each other.

Light provided by the light source 600 may be emitted through the upper surface US of the glass light guide plate LGP. That is, the glass light guide plate LGP may guide light provided by the light source 600 so as for the light to travel toward, or pass through, the upper surface US. That is, the upper surface US may be a light-exiting surface.

FIG. 1 illustrates an example in which the upper surface US is a flat surface, but the shape of the upper surface US is not particularly limited. In one exemplary embodiment, a plurality of functional patterns for performing an optical function may be formed on the upper surface US. The functional patterns that may be formed on the upper surface US may include a plurality of protrusion patterns or a plurality of recess patterns.

The lower surface LS may be disposed to face the upper surface US. The lower surface LS may have substantially the same shape as the upper surface US and may be disposed in parallel to the upper surface US.

The lower surface LS may reflect or scatter light provided by the light source 600 and thus guide the light to travel toward the upper surface US.

FIG. 1 illustrates an example in which the lower surface LS is a flat surface, but the shape of the lower surface LS is not particularly limited. In one exemplary embodiment, a plurality of functional patterns for performing an optical function may be formed on the lower surface LS. The functional patterns that may be formed on the lower surface LS may be patterns for performing a reflection function and/or a scattering function.

A plurality of lateral surfaces may be disposed between the upper surface US and the lower surface LS.

In one exemplary embodiments, the lateral surfaces may include a light-incident surface IS, an opposite surface OS, which is opposite to the light-incident surface IS, and first and second lateral surfaces S1 and S2, which are disposed between the light-incident surface IS and the opposite surface OS.

The light-incident surface IS may be disposed adjacent to the light source 600. That is, light provided by the light source 600 may enter the glass light guide plate LGP through the light-incident surface IS.

The opposite surface OS may be disposed to face the light-incident surface IS. Some of light arriving at the opposite surface OS may be reflected or absorbed by the opposite surface OS, and some of the light may penetrate the opposite surface OS. This will be described later.

The first and second lateral surfaces S1 and S2 may be disposed between the light-incident surface IS and the opposite surface OS. That is, the first lateral surface S1 may connect one side of the light-incident surface IS and one side of the opposite surface OS, and the second lateral surface S2 may connect the other side of the light-incident surface IS and the other side of the opposite surface OS. Accordingly, the first and second lateral surfaces S1 and S2 may face each other.

In one exemplary embodiment, the glass light guide plate LGP may be formed of glass. The glass light guide plate LGP is thermally resistant and experiences a small degree of thermal expansion, as compared with a typical light guide plate formed of a plastic material or the like. By using the glass light guide plate LGP, the backlight unit can be relatively densely formed without consideration of the degree of thermal expansion of the glass light guide plate LGP.

The backlight unit may further include the light source 600, which is disposed on one side of the glass light guide plate LGP. The light source 600 may provide light to the glass light guide plate LGP.

In one exemplary embodiment, the light source 600 may include a printed circuit board (PCB) 55 and light-emitting diodes (LEDs) 56.

The PCB 55 may support the LEDs 56. That is, the LEDs 56 may be mounted on the PCB 55.

In one exemplary embodiment, the PCB 55 may extend in a longitudinal direction. The longitudinal direction may be a direction parallel to a y-axis direction of FIG. 1.

In the exemplary embodiment where the PCB 55 extends in the longitudinal direction, the light-incident surface IS may also extend in the longitudinal direction. That is, the PCB 55 and the light-incident surface IS may extend in parallel to each other to face each other.

The LEDs 56 may be disposed on the PCB 55. The LEDs 56 may be LEDs emitting blue light or ultraviolet (UV) light, but the present disclosure is not limited thereto. That is, the type of the LEDs 56 is not particularly limited.

A plurality of LEDs 56 may be disposed along the PCB 55. That is, the plurality of LEDs 56 may be aligned and disposed along the longitudinal direction. Accordingly, the plurality of LEDs 56 can uniformly provide light to the entire light-incident surface IS.

The light-shielding member LB may be disposed on the side of the opposite surface OS.

The light-shielding member LB may reflect or absorb light arriving at the opposite surface OS. In a case where the light-shielding member LB reflects light, the light-shielding member LB may include a reflective portion RP, and this will be described later.

In a case where the light-shielding member LB absorbs light, the light-shielding member LB may comprise a colored pigment. For example, the light-shielding member LB may comprise a black pigment.

In one exemplary embodiment, the light-shielding member LB may comprise a metal. The metal may be, for example, stainless steel.

In one exemplary embodiment, the light-shielding member LB may be formed of an elastic material. For example, the light-shielding member LB may comprise an elastic material such as urethane or rubber.

In one exemplary embodiment, the light-shielding member LB may comprise an adhesive material. The exemplary embodiment where the light-shielding member LB comprises an adhesive material will be described later.

In one exemplary embodiment, the light-shielding member LB may include a first light-shielding portion P1, which is in contact with the opposite surface OS, a second light-shielding portion P2, which is placed in contact with part of the upper surface US, and a bent portion BP, which connects the first light-shielding portion P1 and the second light-shielding portion P2.

The first light-shielding portion P1 may be in contact with the opposite surface OS. The first light-shielding portion P1 may extend in a direction parallel to a y-axis direction.

In one exemplary embodiment, the first light-shielding portion P1 may cover the opposite surface OS. In one exemplary embodiment, the first light-shielding portion P1 may completely cover the opposite surface OS. In other words, the first light-shielding portion P1 may overlap with the opposite surface OS in a horizontal direction.

In the exemplary embodiment where the opposite surface OS extends in the longitudinal direction (i.e., the y-axis direction of FIG. 1), the first light-shielding portion P1 may also extend in the longitudinal direction. Accordingly, the first light-shielding portion P1 may prevent light from leaking out through the opposite surface OS.

In one exemplary embodiment, the opposite surface OS may be in direct contact with the first light-shielding portion P1. The opposite surface OS and the first light-shielding portion P1 may be in contact with each other without intervening adhesive.

In another exemplary embodiment, a surface of the first light-shielding portion P1 that is in contact with the opposite surface OS may contact the opposite surface OS with an adhesive interposed between the first light-shielding portion P1 and the opposite surface OS. In this exemplary embodiment, the first light-shielding portion P1 and the opposite surface OS may be bonded together by the adhesive.

The second light-shielding portion P2 may be disposed to be connected to the first light-shielding portion P1.

The second light-shielding portion P2 may cover part of the upper surface US. The second light-shielding portion P2 may extend in the horizontal direction. That is, the second light-shielding portion P2 may be disposed in parallel to an x-y plane. Accordingly, the second light-shielding portion p2 may overlap with the upper surface US in a vertical direction.

Referring to FIG. 2, the second light-shielding portion P2 may extend by as much as a first length d1 toward the light-incident surface IS of the glass light guide plate LGP. In one exemplary embodiment, the first length d1 may be 0.4 mm to 0.6 mm.

In one exemplary embodiment, the second light-shielding portion P2 may have a first side 136 and lateral sides 135, which are formed on both sides of the first side 136, in a plan view. The first side 136 may extend in a direction parallel to the y-axis direction. That is, in one exemplary embodiment, the first side 136 may be parallel to the longitudinal direction of the light-incident surface IS or the opposite surface OS.

The lateral sides 135 may extend in a direction parallel to an x-axis direction of FIG. 2. That is, the lateral sides 135 may extend in the same direction as the first and second lateral surfaces S1 and S2.

In one exemplary embodiment, the lateral sides 135 may be disposed on the same plane as the first or second lateral surface S1 or S2.

In one exemplary embodiment, the second light-shielding portion P2 may be in direct contact with the upper surface US. That is, the second light-shielding portion P2 may be in direct contact with the upper surface US without adhesive interposed between the second light-shielding portion P2 and the upper surface US.

In another exemplary embodiment, a surface of the second light-shielding portion P2 that is in contact with the upper surface US may comprise an adhesive material. In this exemplary embodiment, the second light-shielding portion P2 and the upper surface US may be bonded together by the adhesive.

Without the light-shielding member LB, light provided by the light source 600 may leak out through the opposite surface OS. However, in a case where the light-shielding member LB covers the opposite surface OS and part of the upper surface US adjacent to the opposite surface OS, as described above, light can be prevented from leaking out through the opposite surface OS, and thus, a light leakage phenomenon can be prevented.

The cross-sectional shape of the display device according to an exemplary embodiment of the present disclosure will hereinafter be described with reference to FIG. 3.

Referring to FIG. 3, the light-shielding member LB may include the bent portion BP.

In one exemplary embodiment, the light-shielding member LB may be integrally formed, for example, the light-shielding member LB may be formed of a same material and be formed in one piece. As described above, the first light-shielding portion P1 may extend in the vertical direction, and the second light-shielding portion P2 may extend in the horizontal direction. The direction in which the light-shielding member LB extends may change at the bending portion BP. That is, the bent portion BP may connect the first light-shielding portion P1 and the second light-shielding portion P2, and the first light-shielding portion P1 and the second light-shielding portion P2 may meet at the bent portion BP. That is, the light-shielding member LB may be bent at a predetermined angle at the bent portion BP.

The backlight unit may further include an optical sheet 300, which is disposed above the glass light guide plate LGP, and a reflection sheet 400, which is disposed below the glass light guide plate LGP.

The optical sheet 300 may change the path and/or the polarization characteristics of light traveling from the glass light guide plate LGP to the display panel PA and may thus improve the luminance or viewing angle characteristics of the display device according to an exemplary embodiment of the present disclosure.

In one exemplary embodiment, the optical sheet 300 may include one of a light-collecting sheet (such as a prism sheet, a lens sheet, or the like), a diffusion sheet, and a reflective polarizing sheet. FIGS. 1 and 3 illustrate an example in which the optical sheet 300 is provided as a single sheet, but the present disclosure is not limited thereto. That is, in another example, the optical sheet 300 may be the combination of two or more sheets.

The reflection sheet 400 may be disposed below the glass light guide plate LGP. Specifically, the reflection sheet 400 may be disposed between the glass light guide plate LGP and a bottom chassis BS that will be described later.

The reflection sheet 400 may reflect light transmitted through the lower surface LS of the glass light guide plate LGP and may thus guide the light toward the display panel PA. That is, the reflection sheet 400 may make leakage light reusable and may thus contribute to the improvement of light use efficiency.

The reflection sheet 400 may be formed of a material having a light reflection function. For example, the reflection sheet 400 may comprise a plastic material such as polyethylene terephthalate or a metal material. In some exemplary embodiments, the reflection sheet 400 may have a surface coated with a metal such as titanium (Ti), silver (Ag), or the like or a metal oxide such as titanium oxide or the like.

The display device according to an exemplary embodiment of the present disclosure may further include a cushion portion CU, a cover window W, and the bottom chassis BS.

Referring to FIG. 3, the cushion portion CU may be disposed on the light-shielding portion P2. In one exemplary embodiment, the cushion portion CU may be formed of an elastic material. The elastic material may be, for example, rubber or urethane.

The cushion portion CU may perform a buffer function and may support the display panel PA.

In one exemplary embodiment, a second adhesive layer AD2 may be interposed between the cushion portion CU and the second light-shielding portion P2. That is, the cushion portion CU and the second light-shielding portion P2 may be bonded together by the second adhesive layer AD2.

In another exemplary embodiment, the second light-shielding portion P2 may comprise an adhesive material. In this exemplary embodiment, the second adhesive layer AD2 may not be provided, and the cushion portion CU and the second light-shielding portion P2 may be in contact with each other.

The display panel PA may be disposed on the cushion portion CU and the reflection sheet 300.

In one exemplary embodiment, the display panel PA may include a first substrate 500, a second substrate 1000, which faces the first substrate 500, and a liquid crystal layer (not illustrated), which is disposed between the first and second substrates 500 and 1000.

In one exemplary embodiment, the first substrate 500 may be an array substrate on which a plurality of transistors are formed, and the second substrate 1000 may be an opposing substrate, for example, a color filter substrate on which color filters are formed.

In another exemplary embodiment, the color filters may be formed on the first substrate 500. That is, the display panel PA may be a display panel having a color filter-on-array (COA) structure.

In one exemplary embodiment, the first substrate 500 and/or the second substrate 1000 may be formed of glass.

In one exemplary embodiment, the display panel PA may have a display area DA and a non-display area NDA.

The display area DA may be an area in which an image is displayed, and the non-display area NDA may be an area in which various signal lines for displaying an image in the display area DA are disposed.

The cover window W may be disposed on the display panel PA. The cover window W may be formed of a transparent glass or plastic material. That is, the window W may be formed of a light-transmitting material.

In one exemplary embodiment, the cover window W may be flexible. In other words, the cover window W may be formed of a bendable, foldable, or rollable material or have a bendable, foldable, or rollable structure and may thus be bendable, foldable, or rollable.

The bottom chassis BS may be disposed below the glass light guide plate LGP. The bottom chassis BS may secure a predetermined space and may provide a space in which the above-mentioned elements of the display device according to an exemplary embodiment of the present disclosure is mounted. That is, the backlight unit may be received in the bottom chassis BS.

In one exemplary embodiment, the bottom chassis BS and the glass light guide plate LGP may be bonded together by a first adhesive layer AD1. In one exemplary embodiment, the first adhesive layer AD1 may be a double-sided tape.

In one exemplary embodiment, one end of the first adhesive layer AD1 may be disposed outside the opposite surface OS. In this exemplary embodiment, one end of the first light-shielding portion may be in contact with the first adhesive layer AD1, as illustrated in FIG. 3.

Display devices according to other exemplary embodiments of the present disclosure will hereinafter be described. Some elements that will hereinafter be described may be substantially the same as their respective counterparts of the display device according to an exemplary embodiment of the present disclosure, and thus, detailed descriptions thereof may be omitted for simplicity.

Figure 4:
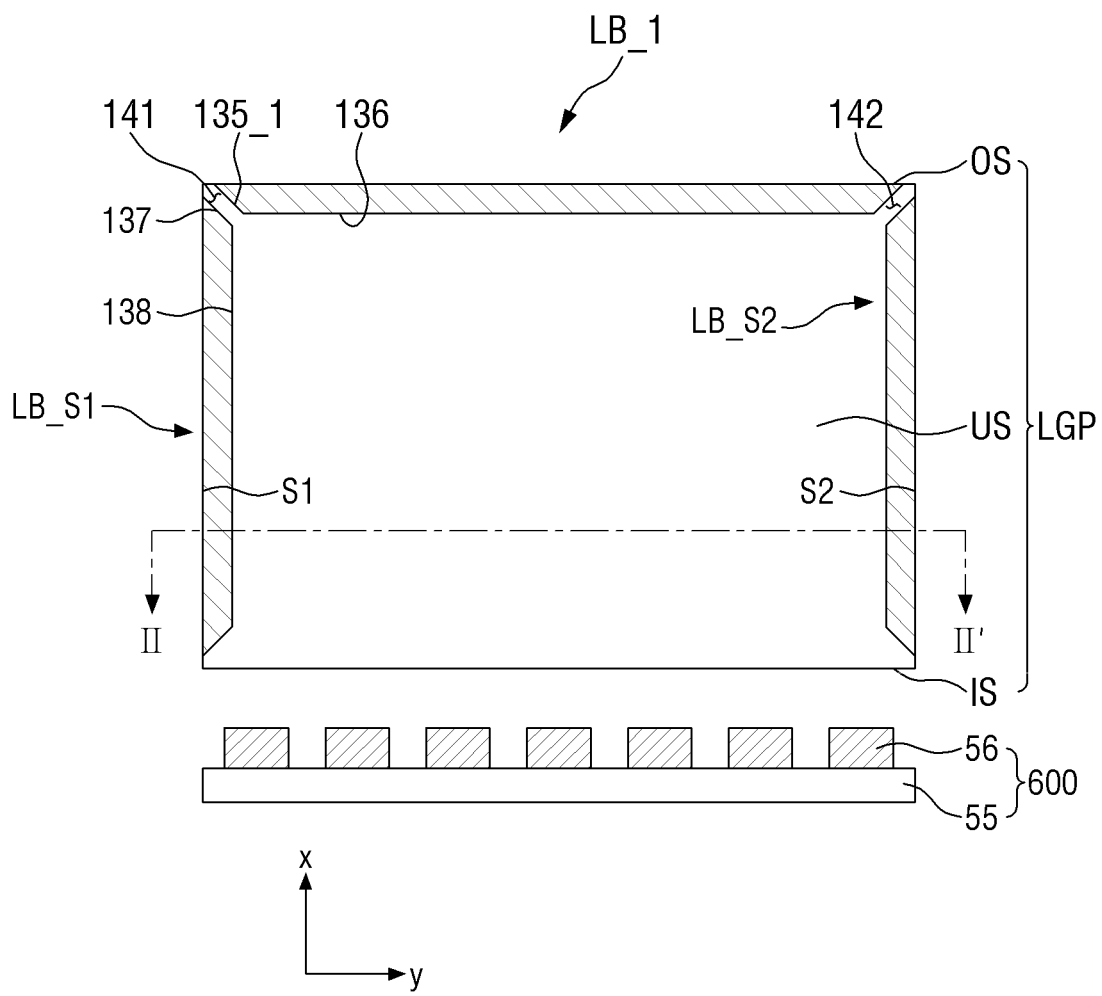
FIG. 4 is a plan view of a display device according to another exemplary embodiment of the present disclosure.
Figure 5:
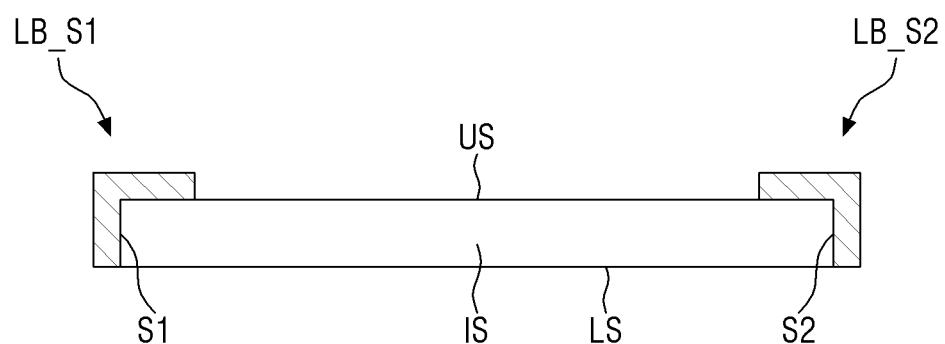
FIG. 5 is a cross-sectional view taken along line II-IF of FIG. 4.

FIG. 4 is a plan view of a display device according to another exemplary embodiment of the present disclosure. FIG. 5 is a cross-sectional view taken along line II-IF of FIG. 4.

A backlight unit of the display device of FIG. 4 differs from the backlight unit of the display device of FIG. 2 in that it further includes a first-side light-shielding member LB_S1 and a second-side light-shielding member LB_S2.

In one exemplary embodiment, the backlight unit may further include the first-side light-shielding member LB_S1, which covers a first lateral surface S1 of a glass light guide plate LGP, and the second-side light-shielding member LB_S2, which covers a second lateral surface S2 of the glass light guide plate LGP.

In one exemplary embodiment, the first-side light-shielding member LB_S1 may cover the first lateral surface S1 of the glass light guide plate LGP and part of a top surface US of the glass light guide plate LGP adjacent to the first lateral surface S1.

Also, as illustrated in FIG. 5, the second-side light-shielding member LB_S2 may cover the second lateral surface S2 of the glass light guide plate LGP and part of the top surface US of the glass light guide plate LGP adjacent to the second lateral surface S2.

The first-side light-shielding member LB_S1 and the second-side light-shielding member LB_S2 may face each other. The first-side light-shielding member LB_S1 and the second-side light-shielding member LB_S2 may have the same shape. That is, the following description of the first-side light-shielding member LB_S1 may be directly applicable to the second-side light-shielding member LB_S2.

Referring to FIG. 4, the first-side light-shielding member LB_S1 may have a first side 138 and lateral sides 137, which are disposed on both sides of the first side 138.

The first side 138 may extend in a longitudinal direction over the upper surface US of the glass light guide plate LGP. The longitudinal direction may be a direction parallel to an x-axis direction of FIG. 4.

In one exemplary embodiment, the lateral sides 137 may extend in diagonal directions. The diagonal directions may be, for example, directions between the x-axis direction and the y-axis direction of FIG. 4.

That is, in a plan view, the first-side light-shielding member LB_S1 may be in a shape whose width gradually decreases from the first lateral surface S1 to the inside of the glass light guide plate LGP.

A first light-shielding portion P1 of a light-shielding member LB_1 may be substantially the same as its counterpart of FIG. 2, and thus, a detailed description thereof will be omitted.

In one exemplary embodiment, a second light-shielding portion P2 may have a first side 136 and two lateral sides 135_1, which are disposed on both sides of the first side 136. The lateral sides 135_1 of the second light-shielding portion P2, unlike the lateral sides 135 of the second light-shielding portion P2 of FIG. 2, may extend in diagonal directions. The diagonal directions may be substantially the same as the directions in which the lateral sides 137 of the first-side light-shielding member LB_S1 extend.

In one exemplary embodiments, the first and second light-shielding portions P1 and P2 may be a predetermined distance apart from each other. That is, a first gap 141 may be formed between the first light-shielding portion P1 and the second light-shielding portion P2.

Similarly, a second gap 142 may be formed between the second light-shielding portion P2 and the second-side light-shielding member LB_S2.

The first and second gaps 141 and 142 may be formed for the convenience of assembly in the process of fabricating the backlight unit.

In one exemplary embodiment, the light-shielding member LB_1, the first-side light-shielding member LB_S1, and the second-side light-shielding member LB_S2 may be formed independently and may be assembled together later. That is, in one exemplary embodiment, the light-shielding member LB_1, the first-side light-shielding member LB_S1, and the second-side light-shielding member LB_S2 may be formed by bending a predetermined material and attaching the bent material on the glass light guide plate LGP. In this exemplary embodiment, the lateral sides of the light-shielding member LB_1, the lateral sides of the first-side light-shielding member LB_S1, and the lateral sides of the second-side light-shielding member LB_S2 may extend in the diagonal directions, and thus, the light-shielding member LB_1, the first-side light-shielding member LB_S1, and the second-side light-shielding member LB_S2 may not overlap with one another over the upper surface US.

In one exemplary embodiment, the first-side light-shielding member LB_S1 and the second-side light-shielding member LB_S2 may be formed of substantially the same material as the light-shielding member LB_1.

Figure 6:
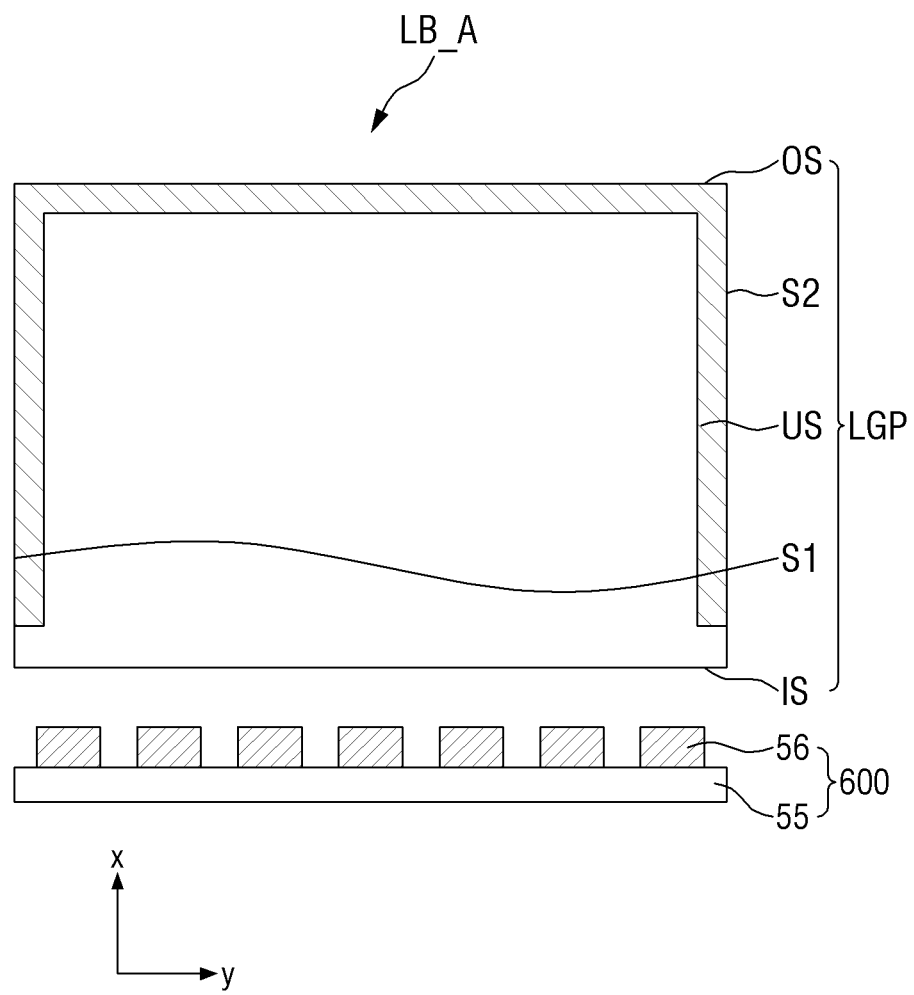
FIG. 6 is a plan view of a display device according to another exemplary embodiment of the present disclosure.

FIG. 6 is a plan view of a display device according to another exemplary embodiment of the present disclosure.

Referring to FIG. 6, the light-shielding member LB_1, the first-side light-shielding member LB_S1, and the second-side light-shielding member LB_S2 of FIG. 4 may be integrally formed as a light-shielding member assembly LB_A, for example, the light-shielding member LB_1, the first-side light-shielding member LB_S1, and the second-side light-shielding member LB_S2 of FIG. 4 may be formed of a same material and be formed in one piece.

The light-shielding member assembly LB_A may be U-shaped in a plan view and may cover a first lateral surface S1, a second lateral surface S2, and an opposite surface OS of a glass light guide plate LGP. The light-shielding member assembly LB_A may cover part of an upper surface US adjacent to the first lateral surface S1, part of the upper surface US adjacent to the second lateral surface S2, and part of the upper surface US adjacent to the opposite surface OS.

In one exemplary embodiment, the light-shielding member assembly LB_A may be formed by connecting the first gap 141 and the second gap 142 of FIG. 4 through welding.

In another exemplary embodiment, the light-shielding member assembly LB_A may be formed by a molding method using a metal mold. In this exemplary embodiment, the glass light guide plate LGP may be inserted in the light-shielding member assembly LB_A.

Figure 7:
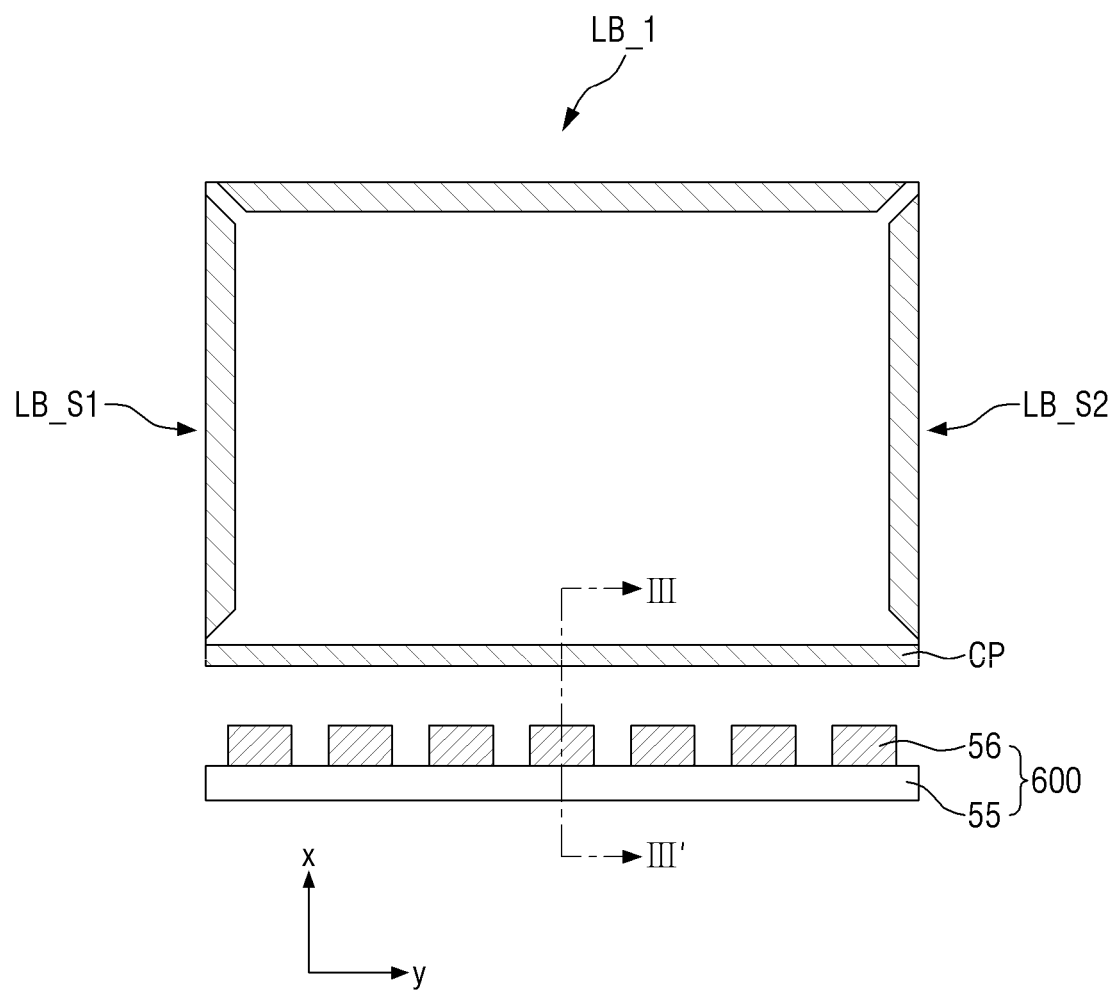
FIG. 7 is a plan view of a display device according to another exemplary embodiment of the present disclosure.
Figure 8:
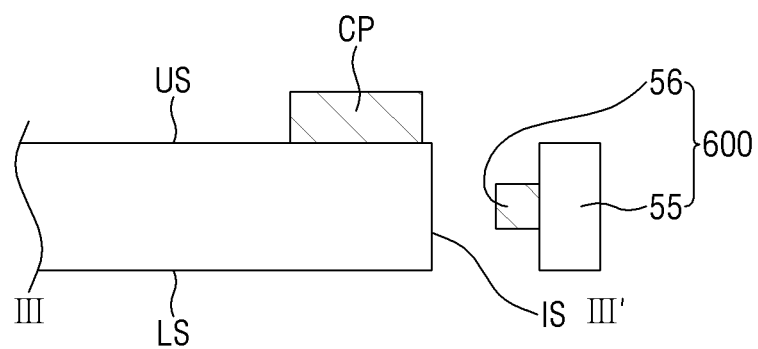
FIG. 8 is a cross-sectional view taken along line III-III' of FIG. 4.

FIG. 7 is a plan view of a display device according to another exemplary embodiment of the present disclosure. FIG. 8 is a cross-sectional view taken along line III-III' of FIG. 7.

Referring to FIGS. 7 and 8, a backlight unit may further include a cover CP, which covers part of an upper surface US adjacent to a light-incident surface IS.

In one exemplary embodiment, the cover CP may be formed of the same material as a light-shielding member LB_1, but the present disclosure is not limited thereto. That is, the material of the cover CP is not particularly limited.

The cover CP covers part of the upper surface US adjacent to the light-incident surface IS, but, unlike the light-shielding member LB_1, does not cover the light-incident surface IS.

As will be described later, a display panel PA may be disposed on a glass light guide plate LGP. In a case where the cover CP is disposed on part of the upper surface US adjacent to the light-incident surface IS, a height difference on the glass light guide plate LGP can be minimized, and the display panel PA can be stably mounted on the glass light guide plate LGP.

Figure 9:
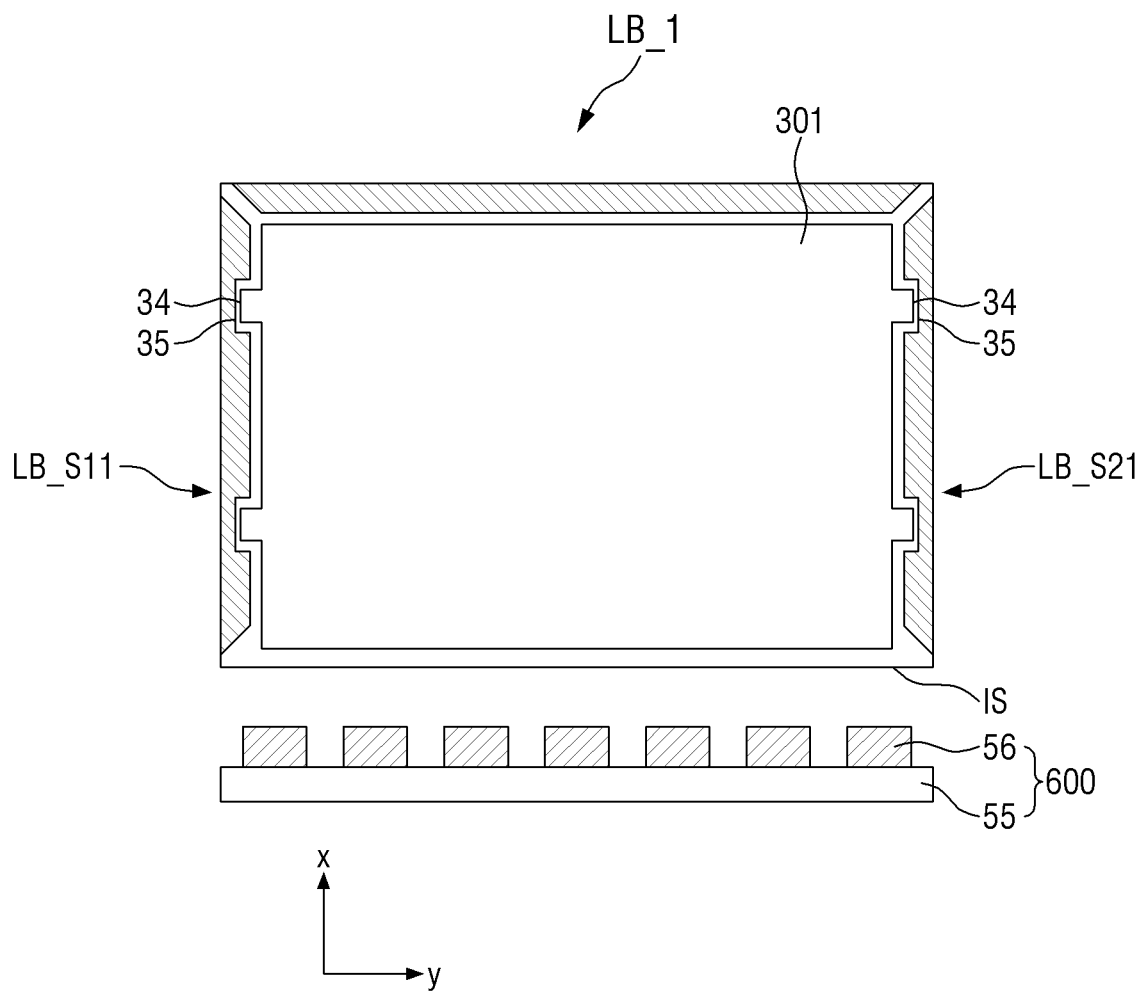
FIG. 9 is a plan view of a display device according to another exemplary embodiment of the present disclosure.

FIG. 9 is a plan view of a display device according to another exemplary embodiment of the present disclosure.

Referring to FIG. 9, each of first-side light-shielding member LB_S11 and the second-side light-shielding member LB_S21 may include one or more recesses 35.

As described above, an optical sheet 301 may be disposed on a glass light guide plate LGP.

In one exemplary embodiment, the optical sheet 301 may include one or more protrusions 34, which protrude in a y-axis direction.

The protrusions 34 of the optical sheet 301 may be disposed to correspond to the recesses 35 of the first-side light-shielding member LB_S11 and the recesses 35 of the second-side light-shielding member LB_S11. Specifically, the protrusions 34 may be received in spaces defined by the recesses 35.

The number of protrusions 34 may be substantially the same as the number of recesses 35. FIG. 9 illustrates an example in which two recesses 35 are formed on each of the first-side light-shielding member LB_S11 and the second-side light-shielding member LB_S21, but the number of recesses 35 formed on each of the first-side light-shielding member LB_S11 and the second-side light-shielding member LB_S21 is not particularly limited.

In a case where the protrusions 34 of the optical sheet 301 are received in the recesses 35, the optical sheet 301 can be prevented from moving. That is, the optical sheet 301 can be stably mounted on the glass light guide plate LGP.

Figure 10:
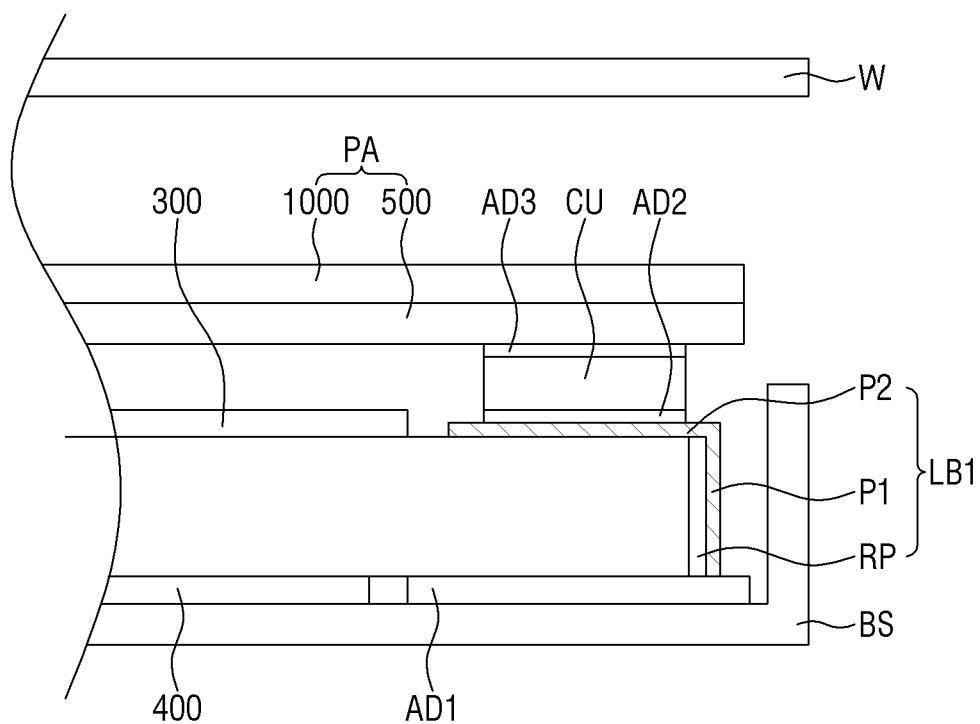
FIG. 10 is a cross-sectional view of a display device according to another exemplary embodiment of the present disclosure.

FIG. 10 is a cross-sectional view of a display device according to another exemplary embodiment of the present disclosure. Referring to FIG. 10, a light-shielding member LB may further include a reflective portion RP, which is disposed on an inner side of a first light-shielding portion P1.

The reflective portion RP may be disposed on the inner side of the first light-shielding portion P1, particularly, between the first light-shielding portion P1 and an opposite surface OS of a glass light guide plate LGP. That is, the opposite surface OS may be in contact with the reflective portion RP of the light-shielding member LB. The reflective portion RP may be formed to extend along the opposite surface OS.

The reflective portion RP may have a reflective performance. Specifically, the reflective portion RP may reflect light traveling toward the opposite surface OS and may thus guide the light toward an upper surface US, a lower surface LS, or a light-incident surface IS.

The material of the reflective portion RP is not particularly limited. That is, any material having a reflective performance may be used as the material of the reflective portion RP. For example, a metal having a reflective performance may be used as the material of the reflective portion RP.

In one exemplary embodiment, the reflective portion RP and the first light-shielding portion P1 may be formed of different materials. For example, in one exemplary embodiment, the reflective portion RP may be formed of a metal, and the first light-shielding portion P1 may comprise urethane or olefin. Alternatively, as already mentioned above, the first light-shielding portion P1 may comprise a colored pigment.

Figure 11:
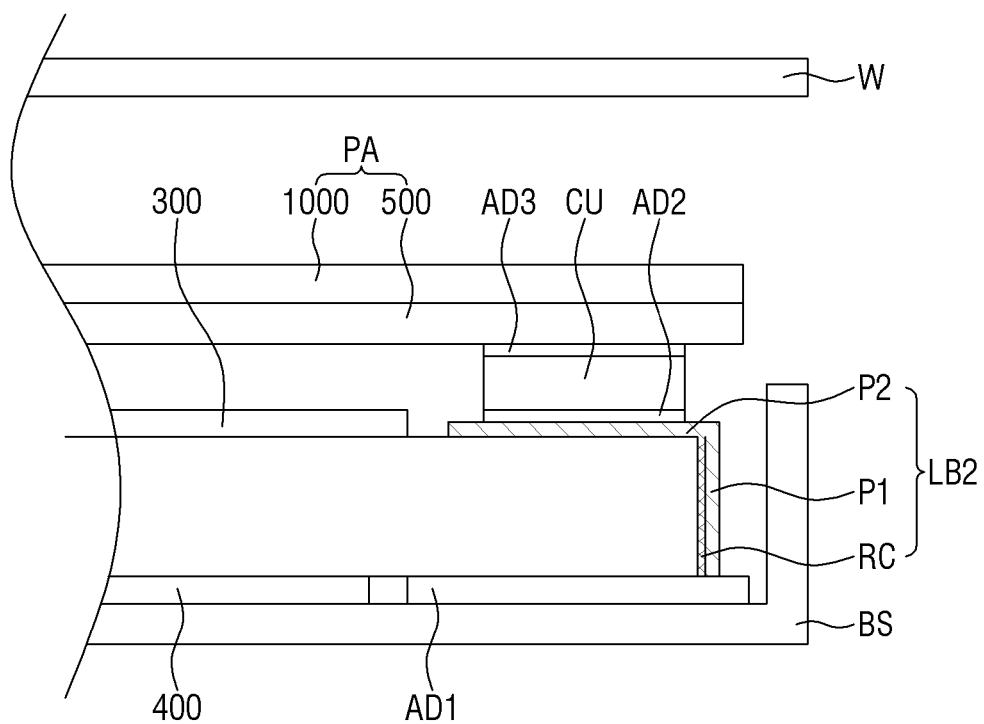
FIG. 11 is a cross-sectional view of a display device according to another exemplary embodiment of the present disclosure.

FIG. 11 is a cross-sectional view of a display device according to another exemplary embodiment of the present disclosure.

Referring to FIG. 11, a reflective coating RC may be formed on an inner side of a first light-shielding portion P1.

In the exemplary embodiment of FIG. 11, unlike in the exemplary embodiment of FIG. 10, the reflective coating RC may be formed on the inner side of the first light-shielding portion P1 to perform the function of the reflective portion RP of FIG. 10.

The reflective coating RC may be formed by metal plating. The function of the reflective coating RC may be substantially the same as the function of the reflective portion RP of FIG. 10.

In a case where the reflective coating RC is used instead of the reflective portion RP of FIG. 10, the thickness of a light-shielding member LB2 can be reduced, and the cost of forming any additional element can be saved.

Figure 12:
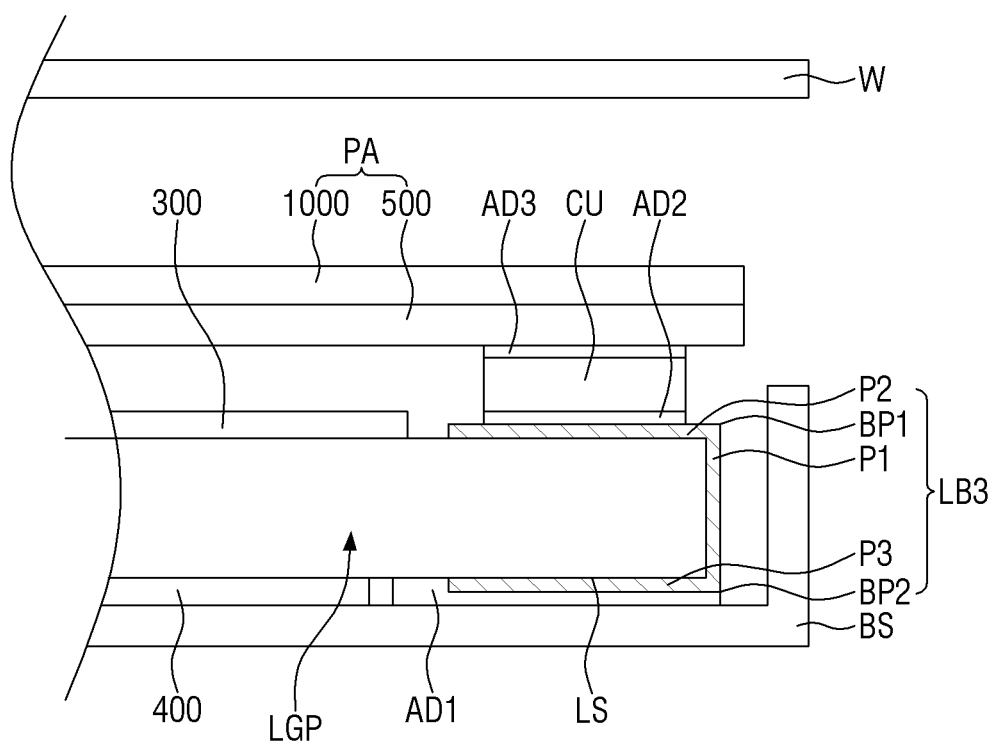
FIG. 12 is a cross-sectional view of a display device according to another exemplary embodiment of the present disclosure.

FIG. 12 is a cross-sectional view of a display device according to another exemplary embodiment of the present disclosure.

Referring to FIG. 12, a backlight unit may further include a third light-shielding portion P3.

In one exemplary embodiment, the third light-shielding portion P3 may cover part of a lower surface LS adjacent to an opposite surface OS. That is, the third light-shielding portion P3 may be in contact with the lower surface LS.

That is, the third light-shielding portion P3 may extend in a horizontal direction and may be disposed in parallel to an x-y plane. Accordingly, the third light-shielding portion P3 may overlap with the lower surface LS in a vertical direction.

In a case where a light-shielding member LB3 further includes the third light-shielding portion P3, the light-shielding member LB3 can be firmly coupled to a glass light guide plate LGP.

The third light-shielding portion P3 may be disposed on opposite surfaces of the glass light guide plate LGP in which the first light-shielding portion P1, the second light-shielding portion P2 and/or the cover CP is disposed.

Figure 13:
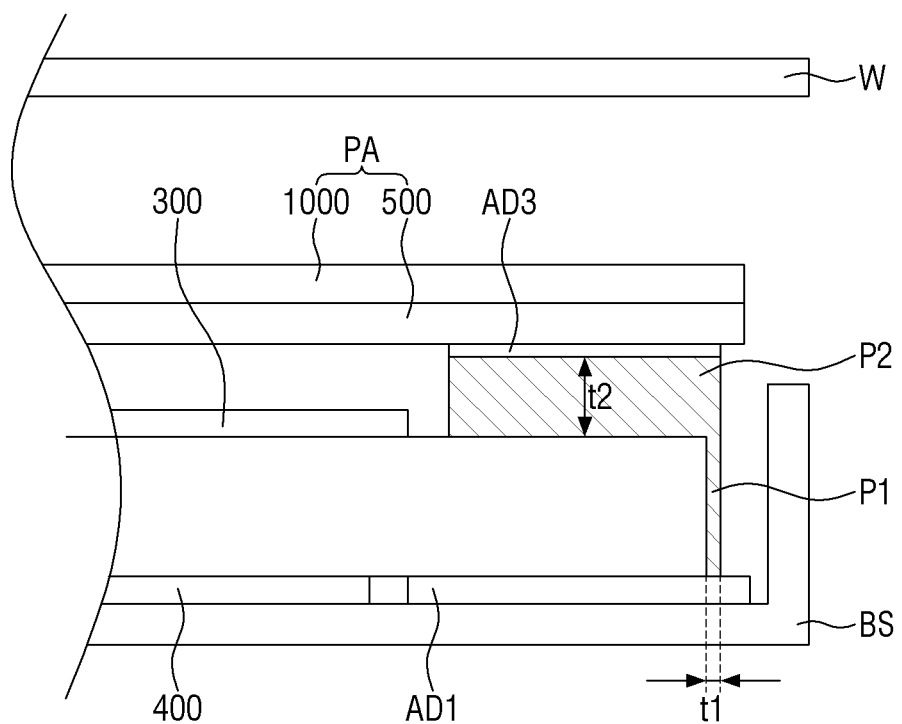
FIG. 13 is a cross-sectional view of a display device according to another exemplary embodiment of the present disclosure.

FIG. 13 is a cross-sectional view of a display device according to another exemplary embodiment of the present disclosure.

Referring to FIG. 13, first light-shielding portion P1 and second light-shielding portion P2 may have different thicknesses.

In one exemplary embodiment, the first light-shielding portion P1 may have a first thickness t1. The first thickness t1 may be, for example, 0.3 mm to 0.4 mm.

The second light-shielding portion P2 may have a second thickness t2. The second thickness t2 may be greater than the first thickness t1.

In one exemplary embodiment, the second thickness t2 may be 0.6 mm to 0.7 mm.

In a case where the second light-shielding portion P2 has the second thickness t2, a cushion portion CU may not be provided.

In this case, a first substrate 500 and the second light-shielding portion P2 may be bonded together with a third adhesive layer AD3 interposed therebetween.

Alternatively, the second light-shielding portion P2 may comprise an adhesive material. In this case, the third adhesive layer AD3 is not provided, and the second light-shielding portion P2 may be in direct contact with the first substrate 500.

However, the effects of the present inventive concept are not restricted to the one set forth herein. The above and other effects of the present inventive concept will become more apparent to one of daily skill in the art to which the present inventive concept pertains by referencing the claims.

While the present inventive concept has been particularly illustrated and described with reference to exemplary embodiments thereof, it will be understood by those of ordinary skill in the art that various changes in form and detail may be made therein without departing from the spirit and scope of the present inventive concept as defined by the following claims. The exemplary embodiments should be considered in a descriptive sense only and not for purposes of limitation.

What is claimed is:

1. A backlight unit comprising:
   a glass light guide plate having an upper surface, a light-incident surface, which is disposed on one side of the upper surface, and an opposite surface, which is disposed on the other side of the upper surface;
   a light source disposed to face the light-incident surface of the glass light guide plate;
   a light-shielding member including a first light-shielding portion, which is in contact with the opposite surface of the glass light guide plate, and a second light-shielding portion, which is in contact with part of the upper surface of the glass light guide plate; and
   a bottom chassis receiving the glass light guide plate, the light source, and the light-shielding member,
   wherein the first light-shielding portion is disposed between the opposite surface of the glass light guide plate and the bottom chassis.

2. The backlight unit of claim 1, wherein the light-shielding member comprises stainless steel.

3. The backlight unit of claim 1, wherein the light-shielding member comprises an adhesive disposed between the opposite surface of the glass light guide plate and the light-shielding member.

4. The backlight unit of claim 3, wherein
   the first light-shielding portion is bonded to the opposite surface of the glass light guide plate, and
   the second light-shielding portion is bonded to the upper surface of the glass light guide plate adjacent to the opposite surface.

5. The backlight unit of claim 1, wherein
   the second light-shielding portion extends over the upper surface of the glass light guide plate by as much as a first length, and
   the first length is 0.4 mm to 0.6 mm.

6. The backlight unit of claim 1, wherein
   the second light-shielding portion has a first side, which is disposed on the upper surface of the glass light guide plate, and lateral sides, which are disposed on both sides of the first side, and
   the lateral sides extend in diagonal directions.

7. The backlight unit of claim 1, wherein
   the glass light guide plate further comprises a first lateral surface and a second lateral surface which are opposite to each other and connect the light-incident surface of the glass light guide plate and the opposite surface of the glass light guide plate, and
   the backlight unit further comprises a first-side light-shielding member and a second-side light-shielding member which are disposed on the first lateral surface of the glass light guide plate and the second lateral surface of the glass light guide plate, respectively.

8. The backlight unit of claim 7, further comprising:
   an optical sheet disposed on the glass light guide plate, the optical sheet including at least one protrusion which extends in a first direction opposite to a center of the glass light guide plate,
   wherein
   each of the first-side light-shielding member and the second-side light-shielding member includes at least one recess which is recessed in the first direction, and
   the at least one protrusion is inserted in the at least one recess.

9. The backlight unit of claim 7, further comprising:
   a gap disposed between the light-shielding member and the first-side light-shielding member.

10. The backlight unit of claim 7, wherein the light-shielding member, the first-side light-shielding member, and the second-side light-shielding member are formed of a same material and are formed in one piece.

11. The backlight unit of claim 1, further comprising:
    a cover disposed on part of the upper surface of the glass light guide plate adjacent to the light-incident surface of the glass light guide plate.

12. The backlight unit of claim 1, further comprising:
    a reflective portion disposed between the opposite surface of the glass light guide plate and the first light-shielding portion.

13. The backlight unit of claim 12, wherein
    the reflective portion comprises a metal, and
    the first light-shielding portion comprises a black pigment.

14. The backlight unit of claim 1, wherein a reflective coating is formed on an inner side of the first light-shielding portion which faces the glass light guide plate.

15. The backlight unit of claim 1, wherein
the glass light guide plate further includes a lower surface, which is opposite to the upper surface of the glass light guide plate, and
the light-shielding member further includes a third light-shielding portion which is in contact with the lower surface of the glass light guide plate.

16. The backlight unit of claim 1, wherein
the first light-shielding portion has a first thickness,
the second light-shielding portion has a second thickness, and
the second thickness is greater than the first thickness.

17. The backlight unit of claim 16, wherein
the first thickness is 0.3 mm to 0.4 mm, and
the second thickness is 0.6 mm to 0.7 mm.

18. A display device comprising:
a backlight unit; and
a display panel disposed on the backlight unit,
wherein the backlight unit includes
a glass light guide plate having an upper surface, a light-incident surface which is disposed on one side of the upper surface, and an opposite surface which is disposed on the other side of the upper surface,
a light source disposed to face the light-incident surface,
a light-shielding member including a first light-shielding portion which is in contact with the opposite surface, and a second light-shielding portion which is in contact with part of the upper surface, and
a bottom chassis receiving the glass light guide plate, the light source and the light-shielding member,
wherein the first light-shielding portion is disposed between the opposite surface of the glass light guide plate and the bottom chassis.

19. The display device of claim 18, further comprising:
a cushion portion disposed on the second light-shielding portion.

20. The display device of claim 18, further comprising:
an adhesive layer disposed between the bottom chassis and the glass light guide plate and attaching the bottom chassis and the glass light guide plate together.

* * * * *